Patented July 1, 1952

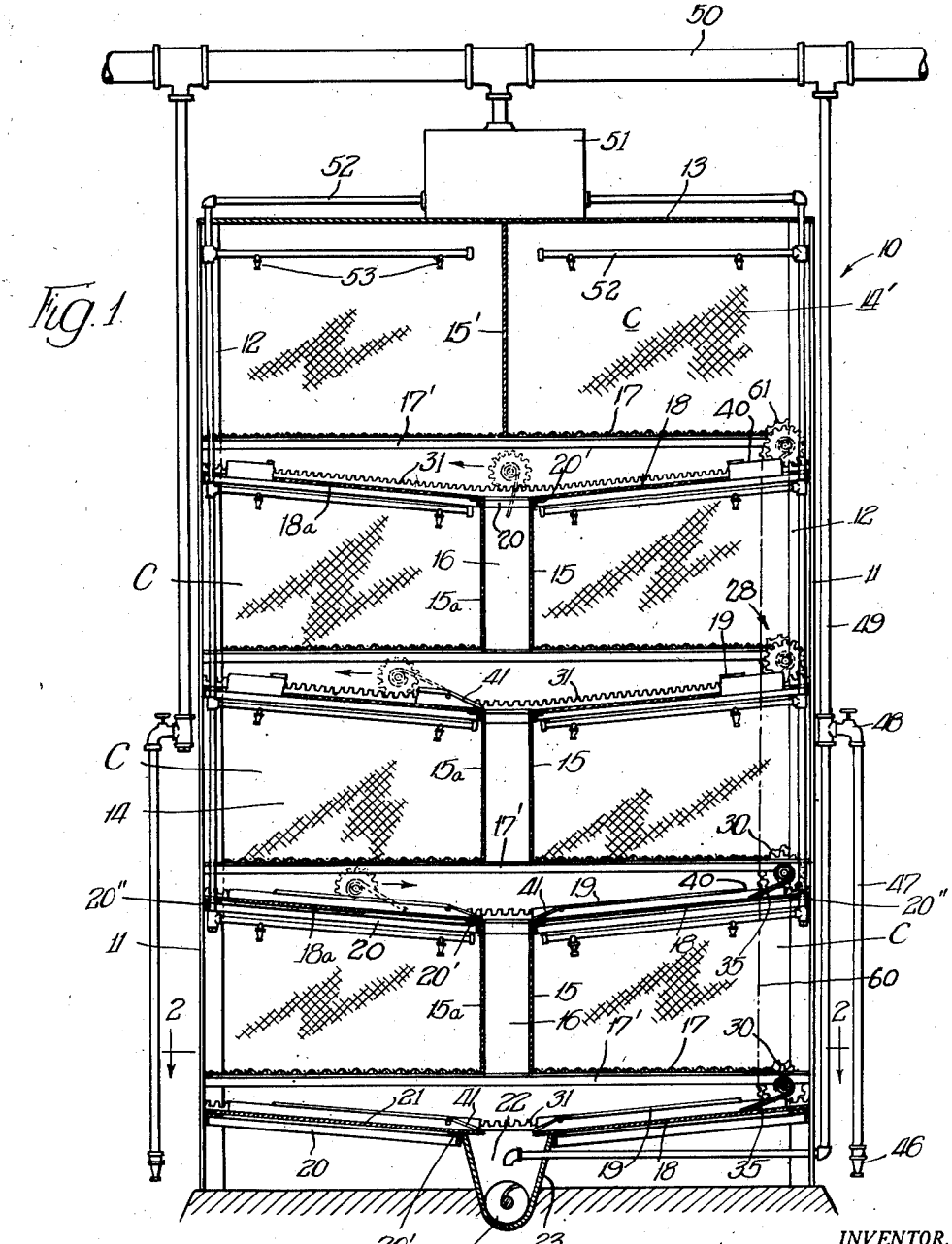

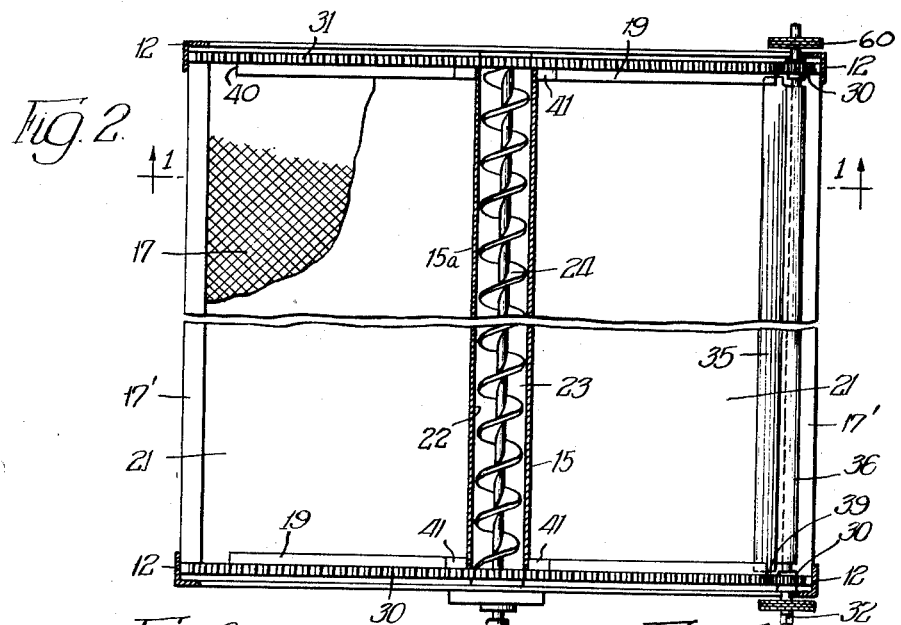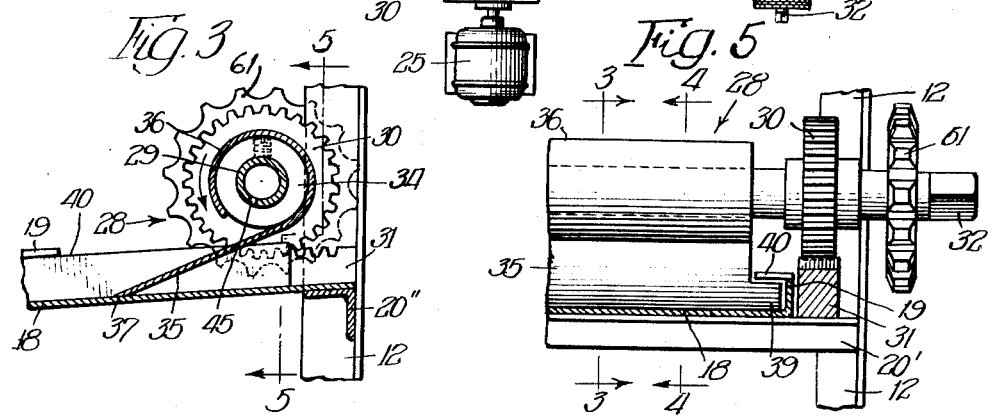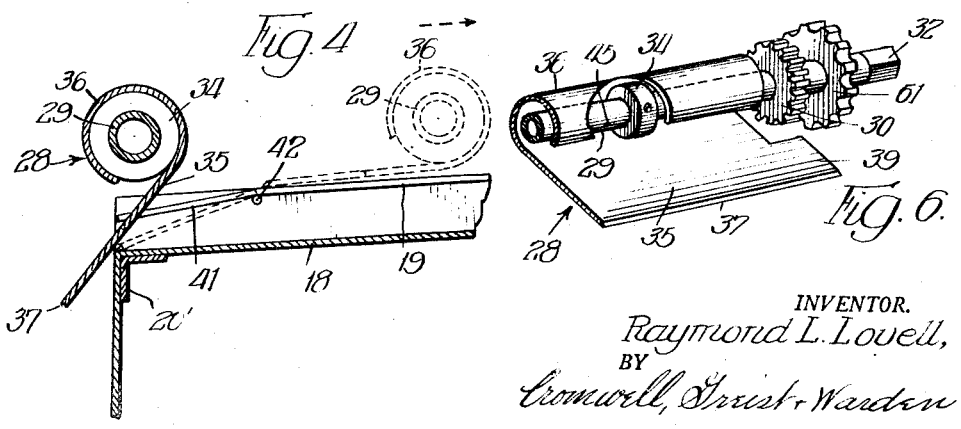

2,601,844

UNITED STATES PATENT OFFICE 2,601,844

CLEANING APPARATUS FOR BATTERY CAGES

Raymond L. Lovell, Chicago, Ill.

Application March 29, 1949, Serial No. 84,235

4 Claims. (Cl. 119—21)

This invention pertains to an improved apparatus or system for cleaning poultry batteries or related types of animal cages.

The maintenance of a clean sanitary condition in a large scale poultry house has for years presented a problem, and it is readily appreciated that the disagreeable conditions regarding cleanliness, odor and general sanitation have heretofore rendered it difficult to retain personnel to operate such an establishment. This is particularly true in cases where the attendants are required to manually handle and remove the droppings of the poultry, as by hand scraping the floors of the battery into disposal pans and ultimately disposing of this matter outside of the poultry house.

Various attempts have heretofore been proposed in solution of the aforesaid problem, in the form of automatic apparatus performing the scraping and disposal functions. An example of an apparatus of this type is illustrated and described in my Patent 2,383,326, dated August 21, 1945. The present apparatus represents a further improvement on the structure involved in said patent.

It is an object of the present invention to provide an improved cleaning apparatus for a poultry house battery or like animal confining installation which is highly efficient in operation, relatively simple and inexpensive in its parts and readily operated by unskilled personnel, said apparatus making a complete disposal of the droppings or other matter to a point externally of the poultry house, without requiring the manual intervention of the attendant in this disagreeable procedure.

Another object is to provide an improved battery cleaning apparatus of the foregoing type, characterized by a plurality of vertically spaced decks or tiers, each inclined inwardly and downwardly towards a centrally disposed, gravity discharge opening or chute, and by a plurality of inwardly traveling scraper blades adapted to slide over certain collector floor surfaces which receive droppings through the wire flooring of said decks which is located thereabove, said scraper blade having a laterally reciprocating movement across the full width of the deck and operating on floors of said deck which are disposed on either side of said central chute to remove droppings from the floors and discharge the same into the chute.

A still further object is to provide a poultry house installation of the above type including a tier-type battery having a discharge chute located to one side of the dropping floor of a tier thereof, together with a scraper or flushing device adapted to reciprocate across said floor in a direction to and from said chute, i. e., transversely of the length of the tier, whereby to secure a very quick scraping or flushing action, and one which is very effective at any local point on the floor.

Another object is to provide an improved battery cleaning apparatus including a combined scraping and flushing device adapted to be translated across a dropping floor to scrape or flush the latter, as desired, in which the flushing provisions of said device act to maintain the scraper blade thereof, as well as said floor, in a clean condition.

A still further object is to provide a battery cleaning apparatus characterized by a traveling cleaning, scraping or flushing device having a substantially reduced length of stroke over a given dropping floor area, as compared to existing devices of a related nature.

The foregoing statements are indicative in a general way of the nature of the invention, but other and more specific objects will be apparent to those skilled in the art upon a full understanding of the construction and operation of the apparatus.

A single embodiment of the invention is presented herein for purpose of exemplification, but it will be appreciated that the invention is susceptible of incorporation in other modified forms coming equally within the scope of the appended claims.

In the drawings,

Fig. 1 is a fragmentary view in transverse vertical section through a unit of a poultry battery incorporating the invention, being in section along line 1—1 of Fig. 2, this view illustrating the operating relationship to the battery per se of the cleaning devices associated therewith, and also illustrating certain provisions for supplying flushing water to said devices, as well as drinking water for the fowl or animals in the battery, parts being broken away and parts removed;

Fig. 2 is a plan view, approximately from line 2—2 of Fig. 1, illustrating the relationship of scraper device, dropping floor and discharge chute of the battery of the invention;

Fig. 3 is an enlarged fragmentary view in transverse vertical section along line 3—3 of Fig. 5, illustrating certain details of structure of the scraper-flusher of the apparatus and the manner in which it is mounted for transverse reciprocatory movement across the floor of the battery;

Fig. 4 is an enlarged fragmentary view in transverse vertical section taken approximately along the line 4—4 of Fig. 5, further illustrating the arrangement of parts of the scraping and flushing device and the guide track therefor;

Fig. 5 is an enlarged fragmentary view in vertical longitudinal section, approximately on line 5—5 of Fig. 3, further illustrating details of the aforesaid device and its relation to the dropping floor and guide instrumentalities; and Fig. 6 is an enlarged fragmentary perspective view illustrating a detail of the scraper-flusher cleaning device per se.

Referring to Figs. 1 and 2 of the drawings, the poultry battery of the present invention is generally designated by the reference numeral 10. It includes a framework 11 which may be fabricated of inexpensive angle iron construction. This frame includes the corner uprights 12 suitably secured to one another rigidly by cross members, some of which will be referred to, and provided at its top with a cover plate 13. The parts of the frame are connected to one another by welding, riveting or any other suitable means, the construction being generally similar to that illustrated and described in my patent identified above.

The space within the frame 11 is subdivided into vertically spaced decks 14, of which there are four in the illustrated embodiment, although a greater or lesser number are contemplated by the invention. Fig. 1 illustrates a single unit of the battery under consideration, and it will be understood that a given installation may include as many of such units as is desired. Wire mesh partitions 14' are employed to longitudinally subdivide the decks 14 into as many compartments C as are desired and the parallel longitudinally and vertically extending partitions 15, 15a of sheet metal, plywood, etc., which are disposed adjacent the center of the battery unit and spaced laterally from one another, serve to subdivide each deck into the individual cages or compartments C. The space between said partitions 15, 15a serves as a disposal chute 16 for a purpose to be described. A single longitudinal vertical partition 15' may be employed to separate the compartments of the topmost deck, since the need for a chute does not exist at this elevation.

Each compartment C is provided with a wire mesh floor 17, through which the poultry droppings are adapted to gravitate. Floors 17 may be supported by transverse angle iron braces 17' extending between one or corner uprights 12 of the frame 11 or in any other appropriate manner. A dropping floor of sheet metal or other equivalent, imperforate construction is provided underneath each of the mesh floors 17. There are two longitudinal dropping floors extending transversely outwardly of the partitions 15, 15a, and they are designated 18, 18a, respectively. These imperforate floors extend longitudinally of the battery apparatus in the illustrated embodiment, though the unit may be of sectional construction as hereinafter referred to, and they are inclined laterally inwardly and downwardly, as indicated in Fig. 1, from the side of the unit towards the aforesaid disposal chute 16. At its opposite end extremities the floors 18, 18a are flanged upwardly and inwardly, as designated by the reference numeral 19 (see Figs. 3, 4 and 5), to provide a guide track for the scraper device to be described.

If desired, the longitudinal partitions 15, 15a and respective disposal floors 18, 18a may each be fabricated as a single unit of generally L-shaped cross section, adapted to be associated with the mesh flooring 17 and the transverse mesh partitions 14 in a manner which will suggest itself to those skilled in the art. The dropping floor is also appropriately supported in any suitable fashion, for example, by the transversely extending angle iron pieces 20, welded or otherwise secured at opposite ends of the frame to the uprights 12, by which pieces the longitudinally extending angle iron stringers 20' are sustained. The unitary floor and partition 15, 18 (or 15a, 18a) is supported at its inner end on said stringers. At its outer end each of said floors may rest on a longitudinal angle iron 20'' extending from end to end of the unit.

Reference has been made to an installation involving a single elongated battery unit, however, it will be appreciated that in the event of a very long structure it will undoubtedly be necessary to provide further additional floor supporting structure of the above general type. It may also be found desirable to sectionalize the installation longitudinally, particularly insofar as certain of the cleaner actuating provisions of the unit are concerned, if for no other reason than to better distribute and sustain the physical stresses on the parts which arise in the operation thereof. All such simple mechanical modifications are regarded as being within the scope of the invention.

The lowermost deck of the battery is constituted by the sheet metal, inwardly and downwardly inclined floor 21 (see Fig. 1), suitably secured to the frame uprights. This floor structure is provided with an elongated, longitudinally extending, central opening 22 leading to an elongated trough 23. Said bottom floor and related parts are supported in a way similar to that employed for the other decks. A screw-type material conveyor 24 is arranged in trough 23, powered by an electric motor 25 (see Fig. 3), and it will be understood that upon energization of motor 25 any manure or poultry droppings which gravitate through chute 16 and floor opening 22 to the trough 23 are automatically conveyed longitudinally of the battery. They may be discharged externally of the poultry house in the fashion illustrated and described in my patent identified above.

The scraper devices of the present invention are generally designated by the reference numeral 28. There is one for each deck, disposed immediately beneath the wire mesh floor 17 thereof. Each such device includes an elongated, hollow, laterally perforated pipe 29 (see Figs. 3 through 6). In the illustrated embodiment the pipe 29 is of a length approximating the length of the battery frame, or of any particular section of a given installation. Said pipe has a gear or pinion 30 fixed thereon adjacent each end thereof, which gear is adapted to ride on a rack 31 paralleling the scraping floors 18, 18a at each end of the latter. As illustrated in Fig. 1, each of said racks 31 is continuous in nature, extending entirely across the width of its associated deck 14, including the vertically extending chute 16 which separates the compartments or cages of said deck. The racks are supported by the angle iron supports for the floors 18, 18a. Suitable provision, such as a squared end 32, is made on one end of the pipe 29 to receive an operating crank for the purpose of rotating the pipe and thus causing the gear 30 to travel along the aforesaid rack 31. This end of the pipe is open for a purpose to be described.

Collars 34, which are secured to the pipe 29 at spaced points along the length thereof by means of set screws, serve as bearings or bushings for a sheet metal scraper blade 35. This blade is curled at its rear portion, as indicated at 36, and is loosely mounted on the collars 34 for free gravitational shifting in an angular direction, counter-clockwise as viewed in Figs. 3 and 4, about the axis of the pipe. Alternatively, a ball bearing may be employed to mount the blade on the pipe in order to insure a minimum-friction pivoting thereof. The lip 37 of scraper blade 36 thus rests by gravity on the dropping floor 18 or floor 18a to exert a knife-like scraping action as the blade is reciprocated inwardly of said floor toward the disposal chute 16.

It will be noted that the blade lip 37 is shaped to provide a pair of laterally projecting ears 39, one on each opposite side thereof, which ears are received beneath the inwardly overhanging flange 19 of the floors 18, 18a in the fashion illustrated in Fig. 5. This has the effect of downwardly restraining the blade in its travel across the floor, however, it will be further noted by reference to Fig. 3 that the definite frictional drag on scraper 35, which is exerted by the rotating, pipe-secured bearing collars 34, also tends to urge said blade in a direction to maintain effective scraping engagement with the floor, as indicated by the arrows in Fig. 3.

Further referring to Fig. 3, it will be noted that the flange 19 referred to is cut away adjacent its ends to afford an opening 40 therethrough, for a purpose to be described. The opposite end of said flange, i. e., inwardly of the length thereof and adjacent the disposal chute 16, is provided with a gravitational flap 41 which is articulated by a simple hinge 42 to the overhanging guide flange 19, also for a purpose to be described.

Pipe 29, in addition to constituting a pivot and laterally traveling axle for the scraper device 28, as described above, also serves as a conduit through which flushing water is sprayed onto the upper surface of the blade, thus cleansing the same, and onto the dropping floor 18 or 18a. To this end, the pipe is provided with laterally opening perforations 45 and is adapted to be connected at the open end thereof by conventional frictional means with the nozzle 46 of a flexible rubber hose 47 (see Fig. 1). This hose is connected through a suitable manually operated valve 48 and a water line 49 with the main water supply conduit 50, whereby, when operatively applied to the scraper device 28, flushing water is flowed over the blade and onto the floor. This operation is performed by the operator after a set of floors of a given deck have been scraped by device 28, in order to maintain a clean and sanitary condition in the battery.

A float controlled water tank 51 is also connected to the main supply conduit 50 and feeds outgoing lines 52, to which the pick-type water fittings 53, in the respective compartments C, are connected. Alternatively, any suitable arrangement for providing a source of drinking water for the poulty or other caged animals may be substituted for this particular type of fitting.

In the operation of the above apparatus, when it is desired to cleanse the floors 18, 18a the attendant applies a suitable crank to the squared end 32 of the scraper device 28 and by rotating the pipe 29 causes the device to travel along the rack 31. The scraper blade 35 removes the accumulation from the floor as it travels inwardly and downwardly toward the disposal chute 16, in an obvious manner. Upon approaching and engaging the flap 41 of the flanged guide 19 the lateral ears 39 on the scraper blade elevate said flap and the blade passes out from under the latter. In traversing the disposal chute 16, the loose mounting of the blade 35 on its pipe axle enables the blade to gravitate downwardly, thereby discharging the scraped matter to chute 16, through which it falls to the screw conveyor 24 at the bottom of the unit.

Continuing its lateral, gear and rack actuated travel, the blade next passes over the flap 41 of the blade guide structure on the opposite side of said chute 16 and is drawn rearwardly over the upper surface of flap 41 and its associated flange 19 until it reaches the cut away opening 40 of the last named flange and drops therethrough. The direction of rotation of the pipe 29 is now reversed to reverse the direction of travel of the scraper device 28 and it returns toward chute 16, scraping the other floor of the set in question and dropping the scraped matter into the disposal chute 16 prior to riding over the top of the flap 41 of the first named blade guide device.

This operation of translating the device 28 to-and-fro across the width of the battery is illustrated in dotted lines in Fig. 1; it may be repeated until the respective floors 18, 18a of each deck are thoroughly cleansed, although a single pass over each floor usually suffices. Next the operator applies hose 47 to the open end of pipe 29 and sprays water from the interior thereof onto the blade 35 and floor to further cleanse the same. An advantage of the above translational scraper-flusher device is that it allows thorough cleaning of local areas and at any zone of the floor which may have become exceptionally thickly deposited with droppings.

The force of gravity is sufficient to maintain the gear 30 of the device 28 in operative engagement with the rack 31, thereby eliminating the expense of further guide and bearing provisions for said device.

Although an installation is shown which has two compartments C for each deck 14, one on either side of the chute 16, it is evident that the structure permits of a unit having but a single row of compartments for each deck, in which the chute and disposal trough would be arranged, for example, along the wall of a building between said wall and the floors 18, 18a.

In the event it is desired to drive all of the four cleaning devices 28 as a single operation, this can be accomplished by the use of a flexible endless drive chain, illustrated in dotted lines in Fig. 1 and designated by the reference numeral 60. Said chain is shown as being engaged with sprockets 61 (see Figs. 5 and 6) which may be affixed to the pipe 29 externally of the frame. If required, suitable provisions may be made to couple the four devices mechanically for this type of conjoined lateral movement, all driven from a single power source.

The above apparatus is simple and inexpensive in construction, yet rugged and efficient in operation. The principle of scraping laterally from a side of a battery unit to a longitudinally extending vertical chute insures the shortest possible scraping stroke, hence the lightest accumulated load of scraped matter. This is an important advantage in an installation which may be of considerable length. The disagreeable operation of pulling a heavy scraper member a long distance under a heavy load is eliminated. As stated, the unitary, laterally traveling scraper-flusher device presents a great improvement in units of this sort. It enables selective scraping or flushing at any desired part of the floor surface. It is further believed that the gravitational discharge principle, whereby each of two dropping floors of a deck are cleansed by a single scraper-flusher cleaning unit and whereby the scraped matter is automatically disposed of, is a distinct advance in this art. I therefore desire that the invention be construed no more limitedly than is consistent with the appended claims.

I claim:

1. Cleaning apparatus for a unit of a poultry battery or like structure characterized by a plurality of cages arranged in a longitudinal row and each having a dropping floor associated at a lateral margin thereof with a receiver extending longitudinally of the cages, comprising a shaft member mounted for lateral translation over said floor transversely of said row and toward said receiver, a scraper blade carried by said shaft member in scraping engagement with said floor as said shaft member is translated laterally across said floor, and means to so translate said shaft member.

2. Cleaning apparatus for a unit of a poultry battery or like structure characterized by a plurality of cages arranged in a longitudinal row and each having a dropping floor associated at a lateral margin thereof with a receiver extending longitudinally of the cages, comprising a shaft member mounted for lateral translation over said floor transversely of said row and toward said receiver, and having a driving gear thereon, a rack fixedly associated with said floor and in driving engagement with said gear, a scraper blade carried by said shaft member in scraping engagement with said floor as said shaft member is translated laterally across said floor, and means to rotate said gear to so translate said shaft member and said blade.

3. Cleaning apparatus for a unit of a poultry battery or like structure characterized by a plurality of cages arranged in a longitudinal row and each having a dropping floor associated at a lateral margin thereof with a receiver extending longitudinally of the cages, comprising a supporting member mounted for translational movement across said floor transversely of said row and to and from said receiver, a scraper blade loosely pivoted on said supporting member and depending gravitationally into scraping engagement with said floor as said member is moved across the floor, a track extending transversely of said row and engaging said blade to maintain scraping contact of the latter with the floor, a guide for said scraper blade acting to elevate the same relative to said floor during said to-and-fro movement, and means to actuate said blade for said movement.

4. Cleaning apparatus for a unit of a poultry battery or like structure characterized by a dropping floor associated at a lateral margin thereof with a receiver, comprising a supporting member mounted for translational movement across said floor to and from said receiver and having a driving gear thereon, a rack fixedly associated with said floor and in driving engagement with said gear, a scraper blade loosely pivoted on said supporting member and depending gravitationally into scraping engagement with said floor as said member is moved across the floor, a track extending transversely of said row and engaging said blade to maintain scraping contact of the latter with the floor, a guide for said scraper blade acting to elevate the same relative to said floor during said to-and-fro movement, and means to rotate said gear to effect said movement of said blade.

RAYMOND L. LOVELL.

REFERENCES CITED

The following references are of record in the file of this patent:

UNITED STATES PATENTS

| Number | Name | Date |
|---|---|---|
| 2,068,566 | Olson et al. | Jan. 19, 1937 |
| 2,197,160 | Schuppner | Apr. 16, 1940 |
| 2,294,025 | Dagg | Aug. 25, 1942 |
| 2,307,984 | Brand | Jan. 12, 1943 |
| 2,309,458 | Ingraham | Jan. 26, 1943 |
| 2,383,326 | Lovell | Aug. 21, 1945 |
| 2,390,924 | Cornell et al. | Dec. 11, 1945 |